(12) United States Patent
Ge et al.

(10) Patent No.: US 10,715,042 B2
(45) Date of Patent: Jul. 14, 2020

(54) HIGH GAIN DC-DC CONVERTER FOR ELECTRIFIED VEHICLES

(71) Applicant: FORD GLOBAL TECHNOLOGIES, LLC, Dearborn, MI (US)

(72) Inventors: Baoming Ge, Okemos, MI (US); Lihua Chen, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 181 days.

(21) Appl. No.: 16/039,715

(22) Filed: Jul. 19, 2018

(65) Prior Publication Data

US 2020/0028434 A1   Jan. 23, 2020

(51) Int. Cl.
| | | |
|---|---|---|
| *H02M 3/158* | (2006.01) | |
| *H02J 7/00* | (2006.01) | |
| *H02M 1/08* | (2006.01) | |
| *H02P 27/08* | (2006.01) | |
| *B60L 50/51* | (2019.01) | |
| *H02J 7/34* | (2006.01) | |

(52) U.S. Cl.
CPC .............. *H02M 3/158* (2013.01); *B60L 50/51* (2019.02); *H02J 7/0013* (2013.01); *H02M 1/08* (2013.01); *H02P 27/08* (2013.01); *B60L 2210/10* (2013.01); *B60L 2210/40* (2013.01); *H02J 7/345* (2013.01)

(58) Field of Classification Search
CPC ......... H02M 3/158; H02M 1/08; B60L 50/51; B60L 2210/10; B60L 2210/40; H02J 7/0013; H02J 7/345; H02J 7/00; H02J 7/34; H02P 27/08

See application file for complete search history.

(56) References Cited

U.S. PATENT DOCUMENTS

| | | |
|---|---|---|
| 9,106,162 B2 | 8/2015 | Isayeva et al. |
| 2015/0131330 A1 | 5/2015 | Pan et al. |

FOREIGN PATENT DOCUMENTS

| | | |
|---|---|---|
| CN | 102510218 A | 6/2012 |
| CN | 103812349 B | 3/2016 |

(Continued)

OTHER PUBLICATIONS

Dong Cao, et al., Low-Cost Semi-Z-source Inverter for Single-Phase Photovoltaic Systems, IEEE Transactions on Power Electronics, vol. 26, No. 12, Dec. 2011.

(Continued)

*Primary Examiner* — Robert L Deberadinis
(74) *Attorney, Agent, or Firm* — David B. Kelley; MacMillan, Sobanski & Todd, LLC

(57) ABSTRACT

A variable voltage converter transfers charge between a battery and a DC link. A first inductor couples a positive battery node and a first node. A first transistor selectably couples the first node to a negative battery node. A first capacitor has a negative terminal coupled to the negative battery node. A second inductor couples a positive terminal of the first capacitor to a second node. A second capacitor has a positive terminal coupled to the first node. A second transistor selectably couples the second node to a negative terminal of the second capacitor. When the transistors are non-conducting, the second inductor charges the DC link and the first inductor charges the first and second capacitors. When the transistors are conducting, the inductors are energized in parallel by the battery and the first and second capacitors. High voltage gain is obtained at relatively low values for the PWM duty cycle.

13 Claims, 4 Drawing Sheets

(56) References Cited

FOREIGN PATENT DOCUMENTS

| | | |
|---|---|---|
| CN | 104009633 B | 8/2016 |
| CN | 106549577 A | 3/2017 |
| WO | 2011089483 A1 | 7/2011 |

OTHER PUBLICATIONS

J.C. Rosas-Caro, et al., A-DC-DC Multilevel Boost Converter, IET Power Electron, 2010, vol. 3, Iss. 1, pp. 129-137, 2008.

HIGH GAIN DC-DC CONVERTER FOR ELECTRIFIED VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to DC-DC converters in electric drive systems for electrified vehicles, and more specifically to a circuit topology of a switching DC-DC converter achieving a high voltage gain using relatively small component sizes and low power losses.

Electric vehicles, such as hybrid electric vehicles (HEVs), plug-in hybrid electric vehicles (PHEVs), and battery electric vehicles (BEVs), use inverter-driven electric machines to provide traction torque. A typical electric drive system may include a DC power source (such as a battery pack or a fuel cell) coupled by contactor switches to a DC-DC converter (also known as a variable voltage converter, or VVC) to regulate a main bus voltage across a main DC linking capacitor. A 3-phase motor inverter is connected between the main buses and a traction motor in order to convert the DC bus power to an AC voltage that is coupled to the windings of the motor to propel the vehicle. During deceleration of the vehicle, the motor can be driven by the vehicle wheels and used to deliver electrical power to charge the battery during regenerative braking of the vehicle, wherein the DC-DC converter works in the opposite direction to convert the generated power to a voltage appropriate for charging the battery pack. In some vehicles, another 3-phase inverter may also be present to connect the DC bus to a generator which is driven by an internal combustion engine to charge the battery or provide power to the motor.

Using the appropriate modulation of the power switches, a VVC can operate in boost mode (converting to a higher voltage), buck mode (converting to a lower voltage), or pass-through mode (no change in voltage). For use in a hybrid electric vehicle driver system, the VVC is also configured to selectably provide bi-directional power flow.

The typical VVC includes at least one phase leg with upper and lower transistor switching devices (e.g., insulated gate bipolar transistors, IGBTs) connected in series across the DC link capacitor. An intermediate junction between the switching devices is connected to the source battery via an inductor. An electronic controller provides switching signals (i.e., gate signals) to turn the switching devices on and off according to a modulation scheme that provides the desired VVC mode. Pulse width modulation is typically used to control the stepping up of a voltage by the VVC, wherein a duty cycle of the switching signals can be varied in order to regulate the VVC voltage to a desired magnitude.

The voltage gain of conventional DC-DC converters have been limited and/or power losses have been significant. For the typical circuits, the gain is determined by a duty cycle D defined as $T_{on}/T_s$, where $T_{on}$ is the conduction duration of the lower switching device and $T_s$ is the switching period. Based on the duty cycle, the voltage gain G is determined by the formula $$G = \frac{V_{dc}}{V_b} = \frac{1}{(1-D)}.$$

The converter efficiency dramatically decreases with increasing the duty cycle D when voltage gain G is larger than two. Consequently, the voltage gain for conventional DC-DC converters has typically been limited to less than three. Higher voltage gains would be desirable to reduce motor inverter loss over a wide speed range operation. In addition, operating the DC-DC converter at a higher duty cycle for most of the time results in higher power loss and high voltage stress within the phase leg switching devices. Therefore, an improved variable voltage converter is needed that can provide higher voltage gain at reduced duty cycles.

Another potential drawback of conventional interleaved converters is that high current ripple in the inductors creates a larger power loss when the duty cycle D is high. Large inductors have been necessary to limit current ripple, but they are lossy, bulky, and heavy which is undesirable for high power HEV applications.

SUMMARY OF THE INVENTION

In one aspect of the invention, a variable voltage converter is adapted to transfer charge between a power storage unit and a DC link in an electric drive system. A first inductor is coupled between a positive power storage node and a first switching node. A first switching device selectably couples the first switching node to a negative power storage node. A first capacitor having a negative terminal is coupled to the negative power storage node. A second inductor is coupled between a positive terminal of the first capacitor and a second switching node. A second capacitor has a positive terminal coupled to the first switching node. A second switching device selectably couples the second switching node to a negative terminal of the second capacitor. The first and second inductors are connected in series when the first and second switching devices are non-conducting so that the second inductor charges the DC link and the first inductor charges the first and second capacitors. The first and second inductors are energized in parallel by the power storage unit and the first and second capacitors when the first and second switching devices are conducting.

In a preferred aspect of the invention, a PWM duty cycle is regulated according to a difference between a target voltage and a link voltage. First and second inductors are switched in parallel during a duty cycle ON phase to energize the first inductor from the battery. The inductors are switched in series during a duty cycle OFF phase to de-energize the second inductor into the link. In addition, a pair of capacitors may be charged in parallel at a junction between the inductors during the duty cycle OFF phase, and the capacitors may be discharged in series with the second inductor during the duty cycle ON phase. With the invention, a high gain is obtained while using a relatively low value for the PWM duty cycle, thereby resulting in reduced power losses.

DETAILED DESCRIPTION OF PREFERRED EMBODIMENTS

Figure 1:
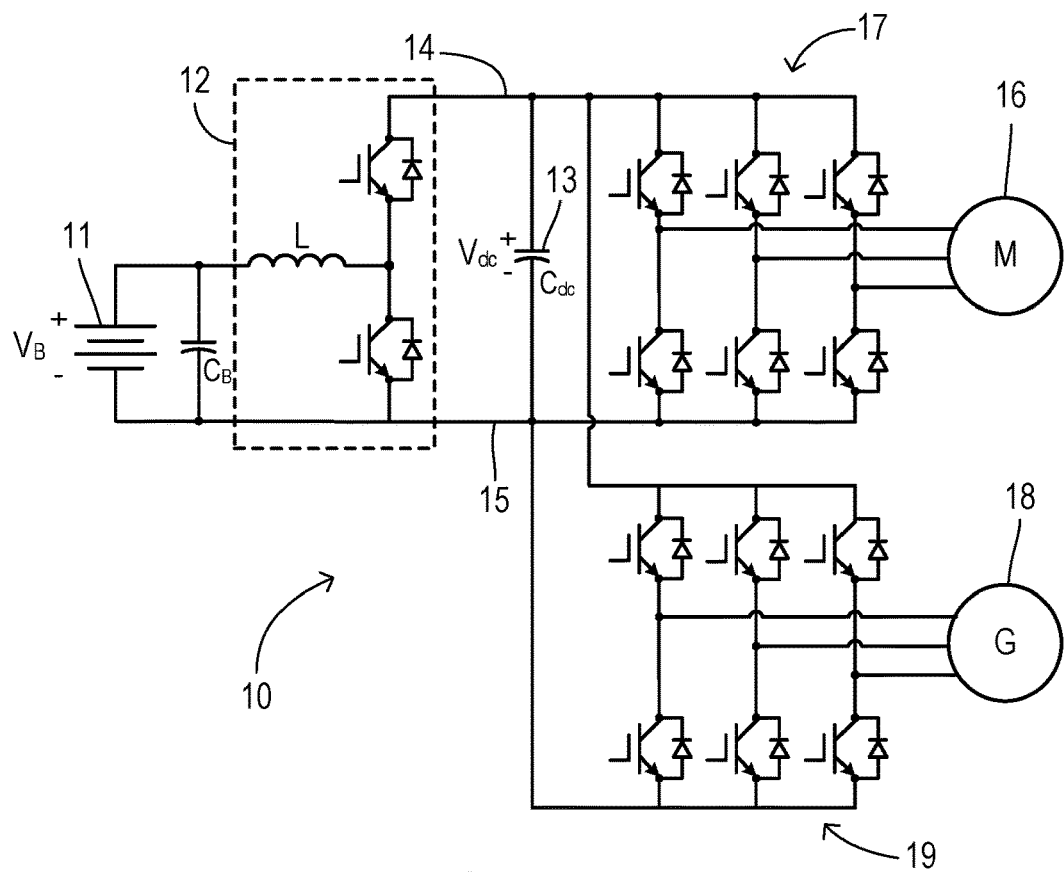
FIG. 1 is a schematic, block diagram showing a conventional variable voltage converter (VVC) in an electric drive of a hybrid electric vehicle.

Referring to FIG. 1, an electric drive 10 of an electrified vehicle includes a DC storage unit 11 (such as a battery pack or a fuel cell) coupled by contactor relay switches (not shown) to a variable voltage converter (VVC) 12. VVC 12 includes an upper switching device and a lower switching device (e.g., insulated gate bipolar transistors or IGBTs) connected in series between a positive DC bus 14 and a negative DC bus 15. A main DC linking capacitor 13 is connected between buses 14 and 15. VVC 12 typically performs a DC-DC conversion between a supply voltage of battery 11 and a higher DC link voltage adapted for operating with a motor 16 and a generator 18. A motor inverter 17 and a generator inverter 19 are coupled between buses 14 and 15. Inverters 17 and 19 are each comprised of a plurality of switching devices in a bridge configuration which are driven according to control signals from a controller and gate driver (not shown) in a known manner to regulate the voltage between buses 14 and 15.

Each of the switching devices in VVC 12 are preferably comprised of an insulated-gate bipolar transistor (IGBT). Each IGBT has a respective control (e.g., base) terminal coupled to a controller (not shown) which controls the switches according to various operating modes of the converter. The controller may be comprised of a motor-generator control unit (MGCU) of a type that is commercially available and is configured to operate as described in U.S. Pat. No. 9,106,162, issued Aug. 11, 2015, which is incorporated herein by reference in its entirety.

Figure 2:
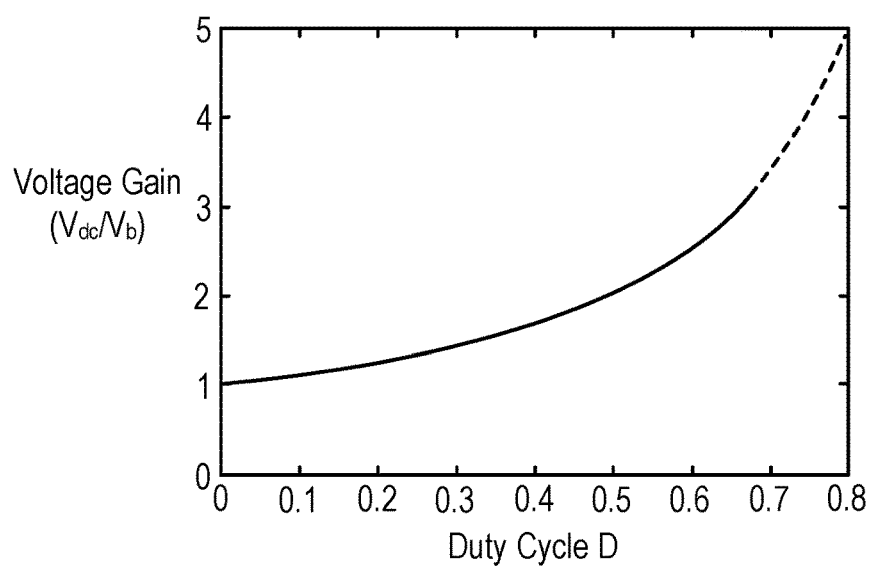
FIG. 2 is a graph showing typical useful voltage gain using a conventional VVC.

In order to obtain a desired voltage gain from VVC 12, a well-known pulse width modulation (PWM) method is typically used to generate gate signals for the IGBT switching devices. For the VVC configuration shown in FIG. 1, the voltage gain G (e.g., from battery voltage $V_b$ to the DC-link voltage $V_{dc}$) is defined as $$G = \frac{V_{dc}}{V_b} = \frac{1}{(1-D)},$$

where the duty cycle D is the percentage of ON-time of the lower switching device of the phase legs. As shown in FIG. 2, gain G gradually increases from 1.0 as the duty cycle increase from zero. However, the known converter cannot provide significant useful gain above about three because converter losses rise significantly for values of duty cycle D above about 0.7.

Figure 3:
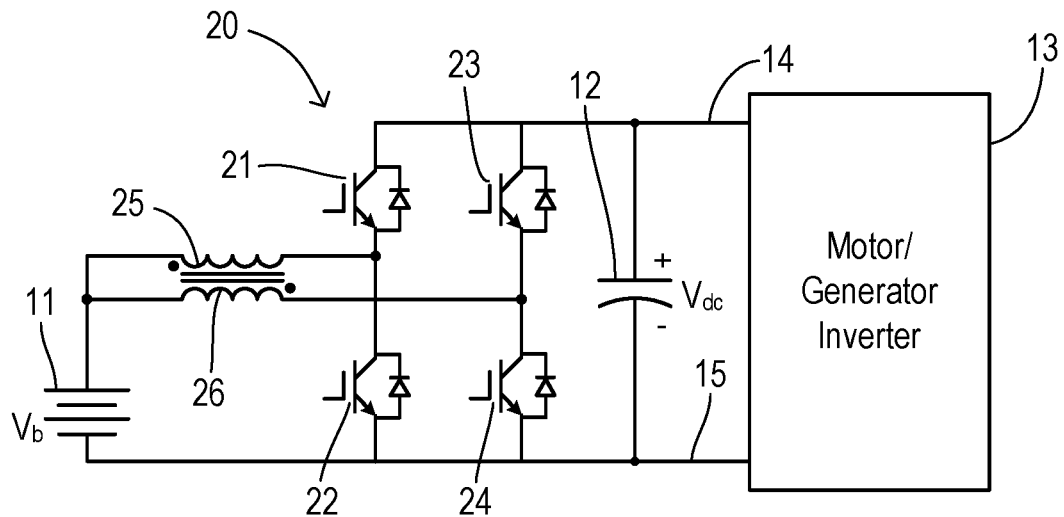
FIG. 3 is a schematic, block diagram showing an interleaved VVC according to the prior art.

Some improvement in voltage gain, efficiency, and size be obtained by increasing the number of phase legs in the VVC, as shown in FIG. 3. A DC-DC variable voltage converter (VVC) 20 is coupled between DC power source 11 and DC link capacitor 12. VVC 20 has interleaved phase legs, including a first phase leg having an upper switching device 21 connected in series with a lower switching device 22 between buses 14 and 15. A first inductor 25 couples a junction between switching devices 21 and 22 to battery 11. A second phase leg has an upper switching device 23 connected in series with a lower switching device 24 between buses 14 and 15. A second inductor 26 couples a junction between switching devices 23 and 24 to battery 11. Inductors 25 and 26 can be inductively coupled (as in a transformer) or can be independent, with no cross coupling. VVC 20 can work in boost mode or in buck mode with power flow in either direction. Switching devices 21-24 work with inductors 25 and 26 in an interleaved way, whereby each inductor and the respective phase leg support half of the battery current (in boost mode). The phase leg switching signals for one leg (which are inverted from each other) have a 180° phase shift compared with the phase leg switching signals for the other leg, which achieves the interleaved operation to significantly reduce battery current ripple. Even though the usable gain may be higher and the current ripple is reduced, the interleaved converter may still have disadvantages of insufficient gain, excessive power loss, and high cost due to the large size of inductors that are needed.

Figure 4:
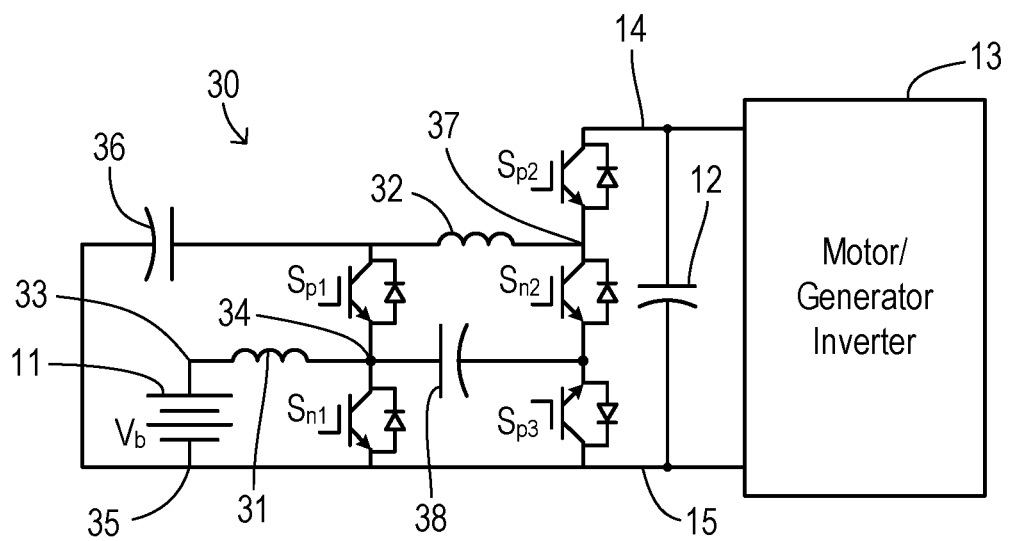
FIG. 4 is a schematic, block diagram showing a VVC according to one embodiment of the invention.

As shown by a first preferred embodiment of the invention illustrated in FIG. 4, an improved variable voltage converter 30 includes a first inductor 31 coupled between a positive power storage node 33 and a first switching node 34. A first switching device $S_{n1}$ selectably couples first switching node 34 to a negative power storage node 35. A first capacitor 36 has a negative terminal coupled to negative power storage node 35. A second inductor 32 is coupled between a positive terminal of first capacitor 36 and a second switching node 37. A second capacitor 38 has a positive terminal coupled to first switching node 34. A second switching device $S_{n2}$ selectably couples second switching node 37 to a negative terminal of second capacitor 38. Switching devices $S_{n1}$ and $S_{n2}$ have respective anti-parallel diodes.

In order to provide bi-directional operation, additional switching devices include a switching device $S_{p1}$ between second inductor 32 and first switching node 34, a switching device $S_{p2}$ between second inductor 32 and DC link capacitor 12, and a switching device $S_{p3}$ between the negative terminal of second capacitor 38 and negative power storage node 35. Switching devices $S_{p1}$, $S_{p2}$, and $S_{p3}$ have respective anti-parallel diodes as shown. If only forward operation is desired (e.g., boost mode and pass-through mode), then only the diodes are necessary and switching devices $S_{p1}$, $S_{p2}$, and $S_{p3}$ can be eliminated. Boost mode (i.e., forward operation in which a battery voltage is increased to a higher voltage level for the DC link) is described with reference to FIGS. 4-7. Buck mode (i.e., reverse operation in which power flows from an inverter to the battery and the voltage magnitude is reduced) operates in an analogous manner which will be readily understood by those skilled in the art.

VVC 30 has a pass-through mode for providing a voltage gain G equal to one. In this mode, switching devices $S_{p1}$, $S_{p2}$, and $S_{p3}$ are turned ON continuously and switching devices $S_{n1}$ and $S_{n2}$ are turned OFF continuously. As a result, capacitors 36, 38, and 12 are in parallel. Therefore, DC link voltage $V_{DC}=V_B$, wherein $V_B$ is the battery voltage.

Figure 5:
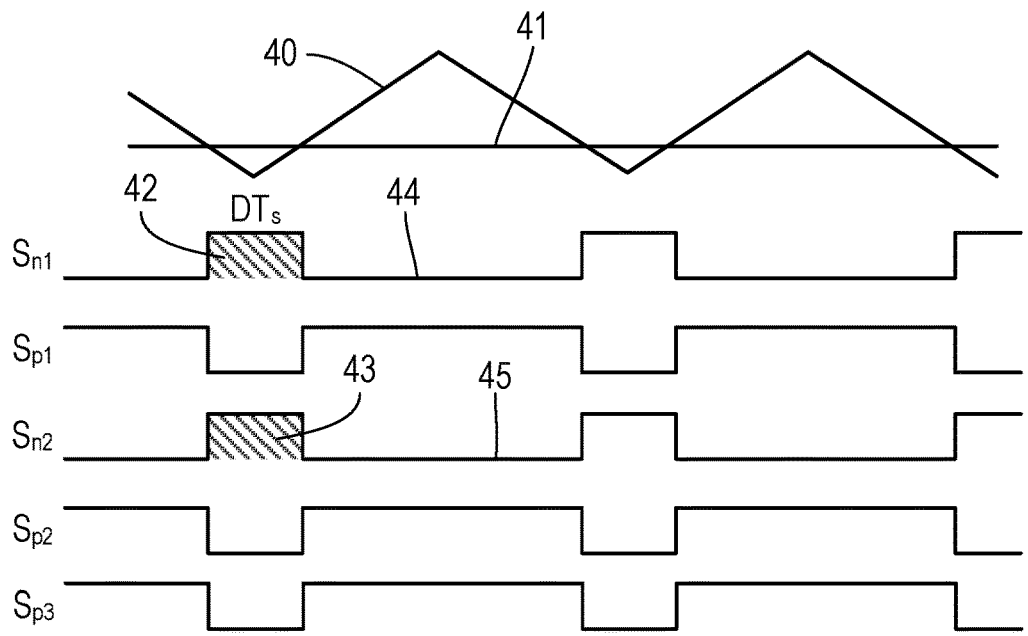
FIG. 5 is a signal diagram showing signals for generating a PWM duty cycles and related switching signals for the switching devices of FIG. 4.

FIG. 5 shows signals associated with operating in the boost mode. A triangle-wave carrier signal 40 having a period $T_S$ is compared with a duty cycle signal 41. The duty cycle has a value D which is regulated according to a difference between a target voltage and an actual voltage applied to the DC link, as known in the art. Gate switching signals for switching devices $S_{n1}$ and $S_{n2}$ are the same. Gate switching signals for switching devices $S_{p1}$, $S_{p2}$, and $S_{p3}$ are the same and are the inverse of the gate signals for switching devices $S_{n1}$ and $S_{n2}$. During each period of carrier signal 40, pulses 42 and 43 represent the duty cycle ON-phase for switching devices $S_{n1}$ and $S_{n2}$. Pulses 42 and 43 have an ON time D·$T_S$ which is a portion of the cycle time $T_S$, wherein D has a value from 0.0 to 1.0. Low logic level signals 44 and 45 represent the duty cycle OFF-phase for switching devices $S_{n1}$ and $S_{n2}$.

Figure 6:
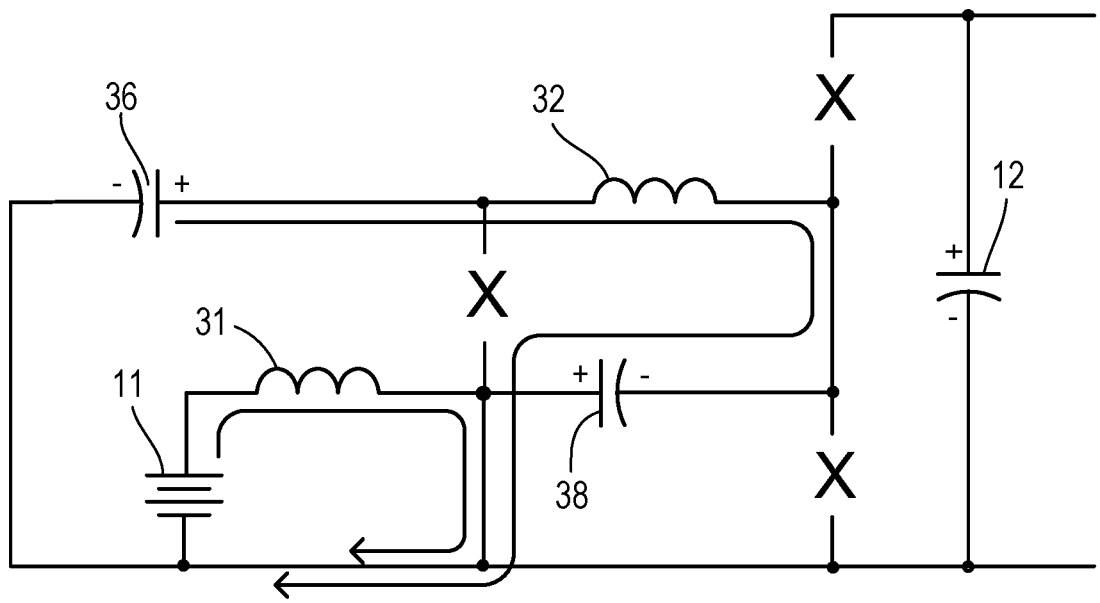
FIGS. 6 and 7 are schematic diagrams showing current flow during ON and OFF phases of the duty cycle.
Figure 7:
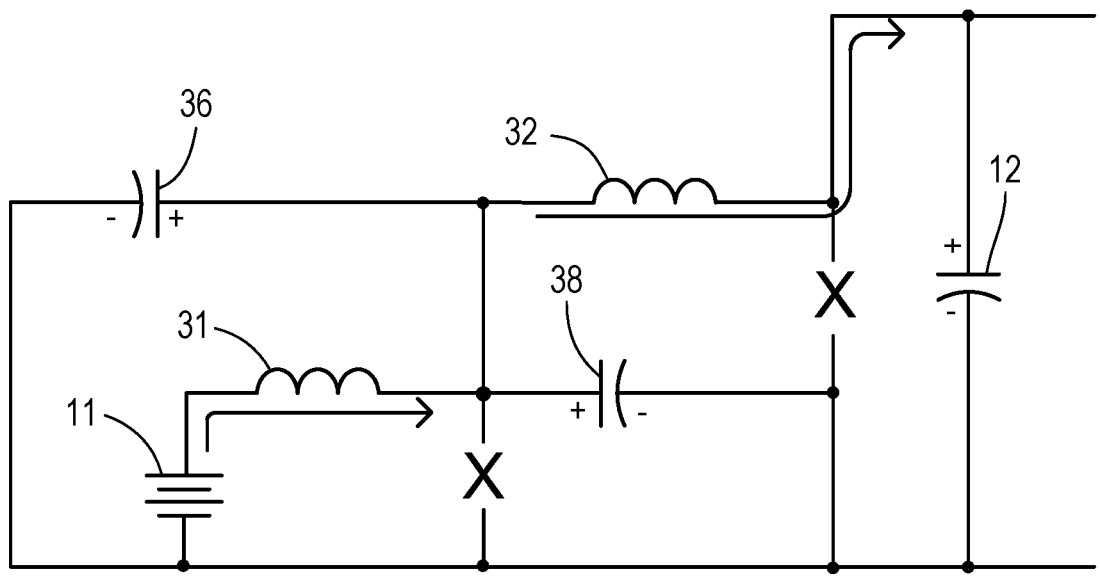

Using the switching signals as shown in FIG. 5 for modulating the converter, a current flows during the duty cycle ON-phase as shown in FIG. 6 and during the duty cycle OFF-phase as shown in FIG. 7. In FIGS. 6 and 7, a conducting switching device/anti-parallel diode is shown as a solid line and a non-conducting switching device/anti-parallel diode is shown as an open circuit (with an "X").

In FIG. 6, first and second inductors 31 and 32 exchange current with battery 11 and capacitors 36 and 38 in parallel when the first and second switching devices $S_{n1}$ and $S_{n2}$ are conducting. Thus, inductors 31 and 32 are energized (i.e., charged) independently by battery 11 and capacitors 36 and 38. During the charging of inductor 32, the voltages on capacitors 36 and 38 are stacked up (i.e., they are discharged in series with inductor 32) so that the charging current of inductor 32 is high.

In FIG. 7 with switching devices $S_{n1}$ and $S_{n2}$ non-conducting, inductors 31 and 32 operate in series. Thus, inductors 31 and 32 are de-energized (i.e., discharged) together, with inductor 32 discharging into DC link capacitor 12 and inductor 31 discharging into capacitors 36 and 38.

During the time represented by D·$T_S$ (i.e., the duty cycle ON phase), voltages within the VVC are as follows:

$$V_B = L1 \frac{\delta i_{L1}}{\delta t} \quad \text{Eq. 1}$$

and $$V_{C1} + V_{C2} = L2 \frac{\delta i_{L2}}{\delta t} \quad \text{Eq. 2}$$

where L1 is the inductance of inductor 31, L2 is the inductance of inductor 32, C1 is the capacitance of capacitor 36, and C2 is the capacitance of capacitor 38. During the time represented by (1−D)·$T_S$ (i.e., the duty cycle OFF phase), voltages within the VVC are as follows:

$$V_{C1} = V_{C2} \quad \text{Eq. 3}$$

$$V_B - V_{C1} = L1 \frac{\delta i_{L1}}{\delta t} \quad \text{Eq. 4}$$

$$V_{C1} - V_{DC} = L2 \frac{\delta i_{L2}}{\delta t}. \quad \text{Eq. 5}$$

For inductor 31, the above equations yield:

$$V_B \cdot DT_S + (V_b - V_{C1})(1-D)T_s = 0 \quad \text{Eq. 6}$$

and $$V_{C1} = \frac{V_B}{1-D}. \quad \text{Eq. 7}$$

For inductor 32, the above equations yield:

$$(V_{C1}+V_{C2})DT_S+(V_{C1}-V_{DC})(1-D)T_s=0 \quad \text{Eq. 8}$$

and $$V_{DC} = \frac{1+D}{1-D} V_{C1}. \quad \text{Eq. 9}$$

The resulting equation for the gain (i.e., voltage boost ration) is as follows:

$$V_{DC} = \frac{1+D}{(1-D)^2} V_B. \quad \text{Eq. 10}$$

Figure 8:
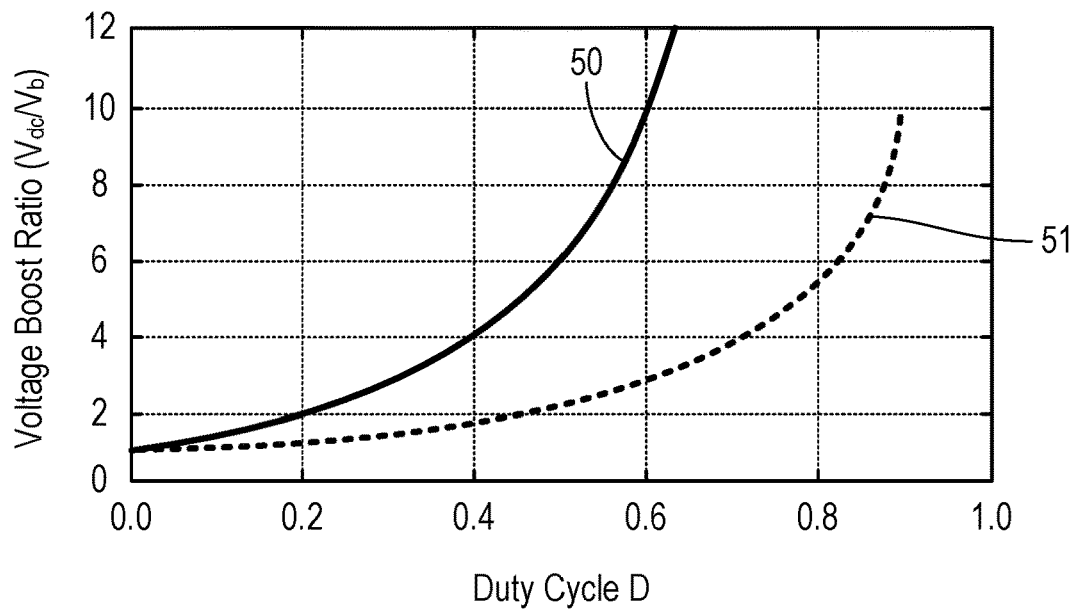
FIG. 8 is a graph comparing the voltage gain (i.e., boost ratio) versus PWM duty cycle of the VVC circuits of the invention and the prior art.

FIG. 8 is a graph showing a curve 50 representing the voltage boost ratio according to duty cycle D compared to a curve 51 of the prior art. Thus, the present invention has a much higher voltage boost ratio and a wider output voltage range. The VVC would be controlled in Pass-Through Mode when the required DC bus voltage is not larger than battery voltage $V_B$. The VVC would be modulated using the signals in FIG. 5 when the required DC bus voltage is larger than $V_B$.

In a representative embodiment, parameters for the circuit components are: L1=L2=50 µH; C1=C2=$C_{DC}$=400 µF; and $V_B$=100 V. A typical electric drive may require a DC link voltage of about 1000 V. Thus, a voltage gain of 10 is needed. The invention obtains the necessary gain with a duty cycle D=0.6. A typical battery current has an average value of 500 A. With a DC bus voltage of 1000 V, the voltages of capacitors C1 and C2 are 250 V. While achieving a boost ratio of 10, the VVC of the invention transfers 50 kW power to the load. In order to achieve a voltage gain of 10 with the prior art VVC, the duty cycle has to be D=0.9 (i.e., much larger than 0.6) which results in significant power loss.

While providing the same boosted DC link voltage from the same battery voltage, the VVC of the present invention uses much smaller inductors when compared with the prior art converter at the same level of battery current ripple. Smaller inductors result in lower inductor losses, easier package in the HEV, and lower costs. The voltage ratings of capacitors C1 and C2 and power switches are also relatively low. Even though additional components are used, the overall cost can be lower due to the favorable characteristics of the components.

What is claimed is:

1. A variable voltage converter adapted to transfer charge between a power storage unit and a DC link in an electric drive system, comprising;
   a first inductor coupled between a positive power storage node and a first switching node;
   a first switching device selectably coupling the first switching node to a negative power storage node;
   a first capacitor having a negative terminal coupled to the negative power storage node;
   a second inductor coupled between a positive terminal of the first capacitor and a second switching node;
   a second capacitor having a positive terminal coupled to the first switching node; and
   a second switching device selectably coupling the second switching node to a negative terminal of the second capacitor;

wherein the first and second inductors are connected in series when the first and second switching devices are non-conducting so that the second inductor charges the DC link and the first inductor charges the first and second capacitors; and wherein the first and second inductors are energized in parallel by the power storage unit and the first and second capacitors when the first and second switching devices are conducting.

2. The converter of claim 1 wherein the converter operates in a forward direction transferring charge from the power storage unit to the DC link, and wherein the converter further comprises:
 a first diode connected to conduct from the first inductor to the second inductor when the first and second switching devices are non-conducting;
 a second diode connected to conduct from the second inductor to the DC link when the first and second switching devices are non-conducting; and
 a third diode connected to conduct from the negative terminal of the second capacitor to the negative power storage node when the first and second switching devices are non-conducting.

3. The converter of claim 2 further comprising:
 a gate driver coupled to the first and second switching devices for activating the first and second switches simultaneously according to a pulse-width modulated duty cycle.

4. The converter of claim 2 wherein the converter further operates in a reverse direction transferring charge from the DC link to the power storage unit, and wherein the converter further comprises:
 a third switching device selectably coupling the second inductor to the first inductor;
 a fourth switching device selectably coupling the DC link to the second inductor; and
 a fifth switching device selectably coupling the negative power storage node to the negative terminal of the second capacitor.

5. The converter of claim 1 wherein the DC link is comprised of a link capacitor feeding an inverter coupled to a motor of the electric drive system.

6. An electric drive system, comprising;
 a power storage unit;
 a DC link;
 an inverter connected to the DC link and configured to connect to an electric machine; and
 a variable voltage converter adapted to transfer charge between the power storage unit and the DC link comprising:
  a first inductor coupled between a positive power storage node and a first switching node;
  a first switching device selectably coupling the first switching node to a negative power storage node;
  a first capacitor having a negative terminal coupled to the negative power storage node;
  a second inductor coupled between a positive terminal of the first capacitor and a second switching node;
  a second capacitor having a positive terminal coupled to the first switching node; and
  a second switching device selectably coupling the second switching node to a negative terminal of the second capacitor;

wherein the first and second inductors are connected in series when the first and second switching devices are non-conducting so that the second inductor charges the DC link and the first inductor charges the first and second capacitors; and wherein the first and second inductors are energized in parallel by the power storage unit and the first and second capacitors when the first and second switching devices are conducting.

7. The drive system of claim 6 wherein the converter operates in a forward direction transferring charge from the power storage unit to the DC link, and wherein the converter further comprises:
 a first diode connected to conduct from the first inductor to the second inductor when the first and second switching devices are non-conducting;
 a second diode connected to conduct from the second inductor to the DC link when the first and second switching devices are non-conducting; and
 a third diode connected to conduct from the negative terminal of the second capacitor to the negative power storage node when the first and second switching devices are non-conducting.

8. The drive system of claim 7 further comprising:
 a gate driver coupled to the first and second switching devices for activating the first and second switches simultaneously according to a pulse-width modulated duty cycle.

9. The drive system of claim 7 wherein the converter further operates in a reverse direction transferring charge from the DC link to the power storage unit, and wherein the converter further comprises:
 a third switching device selectably coupling the second inductor to the first inductor;
 a fourth switching device selectably coupling the DC link to the second inductor; and
 a fifth switching device selectably coupling the negative power storage node to the negative terminal of the second capacitor.

10. The drive system of claim 6 wherein the DC link is comprised of a link capacitor feeding the inverter.

11. The drive system of claim 6 wherein the power storage unit is comprised of battery pack.

12. A method of boosting battery voltage onto a DC link of an electric drive comprising:
 regulating a PWM duty cycle according to a difference between a target voltage and a link voltage;
 switching first and second inductors in parallel during a duty cycle ON phase to energize the first inductor from the battery; and
 switching the inductors in series during a duty cycle OFF phase to de-energize the second inductor into the link.

13. The method of claim 12 further comprising:
 charging a pair of capacitors in parallel from the first inductor during the duty cycle OFF phase; and
 discharging the capacitors in series with the second inductor to energize the second inductor during the duty cycle ON phase.

* * * * *